United States Patent [19]

Ito et al.

[11] Patent Number: 5,093,030
[45] Date of Patent: Mar. 3, 1992

[54] METHOD FOR PRODUCTION OF DISPERSION CONTAINING MINUTE POLYMER BEADS POSSESSING THERMOSENSITIVE CHARACTERISTIC

[75] Inventors: Shoji Ito; Okihiko Tlirasa; Shouei Fujishige; Aizo Yamauchi, all of Tsukuba, Japan

[73] Assignees: Agency of Industrial Science & Technology; Ministry of International Trade & Industry, both of Tokyo, Japan

[21] Appl. No.: 674,904

[22] Filed: Mar. 26, 1991

[30] Foreign Application Priority Data

Apr. 18, 1990 [JP] Japan ................ 2-102500

[51] Int. Cl.$^5$ ............................. B01F 17/00
[52] U.S. Cl. ................ 252/351; 252/363.5; 521/54; 521/55
[58] Field of Search ............ 521/54, 55; 252/351, 252/363.5

[56] References Cited

U.S. PATENT DOCUMENTS

| | | | |
|---|---|---|---|
| 4,059,552 | 11/1977 | Zweigle et al. | 260/29.6 TA |
| 4,172,066 | 10/1979 | Zweigle et al. | 260/29.6 |
| 4,972,000 | 11/1990 | Kawashima et al. | 521/54 |

OTHER PUBLICATIONS

Derwent Abstract JP 127336/1987 "Particles of Polymer with Internal Bore . . . ".
MACROMOLECULES, 19, (1986), Jiro Kumaki, "Polystyrene Monomolecular Particles Obtained by Spreading Dilute Solutions on the Water Surface", pp. 2258-2263.
MACROMOLECULES, 19, (186), D. A. Tomolia, "Dendritic Macromolecules: Synthesis of Starburst Dendrimers", pp. 2466-2468.

*Primary Examiner*—Robert L. Stoll
*Assistant Examiner*—N. Bhat
*Attorney, Agent, or Firm*—Oblon, Spivak, McClelland, Maier & Neustadt

[57] ABSTRACT

A dispersion containing minute polymer beads possessing a thermosensitive characteristic is produced by a method which comprises preparing an aqueous solution of an acrylamide type vinyl compound, the homopolymer of which exhibits a hydrophilicity-hydrophobicity thermoreversible solubility characteristic, adding a cationic or anionic surfactant in a ratio equaling or exceeding the micelle concentration to the aqueous solution, adjusting the resultant aqueous solution to a temperature not lower than the clouding point thereof and, at the same time, polymerizing the acrylamide type vinyl compound in the aqueous solution thereby forming a polymer emulsion, exposing the emulsion to an ionizing radiation thereby cross-linking minute polymer beads in the emulsion, and thereafter depriving the resultant polymer emulsion of the surfactant.

8 Claims, No Drawings

METHOD FOR PRODUCTION OF DISPERSION CONTAINING MINUTE POLYMER BEADS POSSESSING THERMOSENSITIVE CHARACTERISTIC

BACKGROUND OF THE INVENTION

1. Field of the Invention

This invention relates to a method for the production of a novel dispersion containing minute polymer beads possessing a thermosensitive characteristic. More particularly, this invention relates to a method for the production of a dispersion containing minute polymer beads possessing a thermosensitive characteristic and useful as a raw material for diagnostic microbeads, hydrogels for delivery of drugs, adsorbents for non-ionic surfactants, and cosmetics.

2. Description of the Prior Art

For the production of submicron gel beads possessing a thermosensitive characteristic, a method employing reversed-phase suspension polymerization of a composition of solvent-surfactant-aqueous pregel solution has been disclosed [Yoshiharu Hirose, Takayuki Amiya, Yoshitsugu Hirokawa, and Toyoichi Tanaka, "Material for the First Polymer Gel Forum", 39 (1989)]. This method uses n-hexane as the solvent and sorbitan monolaurate as the surfactant. Aqueous solutions of N-isopropyl acrylamide, N-acryloyloxysuccinimide, N,N'-methylenebisacrylamide (a cross-linking monomer), and ammonium persulfate are usable as the aqueous pregel solution. The disclosed method comprises dissolving sorbitan monolaurate in n-hexane under a nitrogen atmosphere, injecting into the resultant solution an initiator-containing aqueous pregel solution, stirring the resultant mixture, and thereafter polymerizing the stirred mixture in the presence of a small amount of tetramethylene diamine. The hydrodynamic diameter of the beads in the resultant product obtained by this method is about 800 nm while the beads are in a swelled state and about 200 to 300 nm while they are in a contracted state.

Ultramicrospheres exhibiting no thermosensitivity and possessing diameters on the nanometer order and colloids thereof are also producible. Dendrimers [D. A. Tomalia, et al.: Macromolecules, 19, 2466 (1986)], monomolecular microspheres [J. Kumaki: Macromolecules, 19, 2258 (1986)], etc. are examples. These particulate products require a complicated process for synthesis, do not allow easy isolation, and are not capable of regulating particle size by varying temperature.

Minute beads possessing smaller diameters than the aforementioned submicron beads and exhibiting a thermosensitive characteristic, specifically a dispersion containing such minute beads, have been increasingly desired as a raw material for diagnostic microbeads, hydrogels for delivery of drugs, adsorbents for non-ionic surfactants, and cosmetics.

An object of this invention, therefore, is to provide a method which allows the production of a dispersion containing these minute beads.

SUMMARY OF THE INVENTION

The inventors continued a study with a view to accomplishing the object described above.

In the course of their work they became aware of the following phenomenon. When the aqueous solution obtained by adding a cationic surfactant or an anionic surfactant in a ratio exceeding a micelle concentration to an aqueous solution of thermosensitive macromolecular compound, it undergoes phase transition on heating and induces precipitation of minute particles within the micelles formed by the surfactant.

The occurrence of this phenomenon in the aqueous solution can be observed as a change in transparency. Since this change in transparency occurs slowly, the phenomenon of phase transition appears to occur slowly in appearance due to the formation of minute particles.

This invention has been accomplished on the basis of this phenomenon.

To be specific, this invention is directed to a method for the production of a dispersion containing minute polymer beads possessing a thermosensitive characteristic, which method comprises preparing an aqueous solution of an acrylamide type vinyl compound, the homopolymer of which exhibits the characteristic of hydrophilicity-hydrophobicity thermoreversible solubility, adding one surfactant selected from the group consisting of cationic surfactants and anionic surfactants in a ratio equaling or exceeding the micelle concentration to the aqueous solution thereby obtaining a homogeneous aqueous solution, adjusting the resultant aqueous solution to a temperature exceeding the clouding point of the aqueous solution and, at the same time, polymerizing the acrylamide type vinyl compound in the aqueous solution thereby producing a polymer emulsion, then adjusting the polymer emulsion to a temperature equaling or exceeding the clouding point thereof and, at the same time, exposing the polymer emulsion to an ionizing radiation thereby cross-linking the polymer, and removing the surfactant from the resultant product.

Since the polymer beads are formed within micelles, the removal of the surfactant requires a special procedure which comprises disintegrating the micelles by addition of methanol or ethanol and further separating the surfactant by the use of an ultrafilter membrane, for example.

DETAILED DESCRIPTION OF THE PREFERRED EMBODIMENTS

The acrylamide type vinyl compound to be used in the present invention is a compound represented by the general formula:

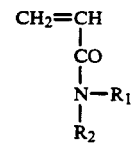

(wherein $R_1$ and $R_2$ each stand for a hydrogen atom, an alkyl group, or alkoxyalkyl group).

Concrete examples of the compound include N-ethyl acrylamide, N-n-propyl acrylamide, N-isopropyl acrylamide, N-cyclopropyl acrylamide, N,N-diethyl acrylamide, N-methyl-N-ethyl acrylamide, N-methyl-N-n-propyl acrylamide, N-methyl-N-isopropyl acrylamide, N-acryloyl piperidine, N-acryloyl pyrrolidine, N-tetrahydrofurfuryl acrylamide, N-methoxypropyl acrylamide, N-ethoxypropyl acrylamide, N-isopropoxypropyl acrylamide, N-ethoxyethyl acrylamide, N-(2,2-dimethoxyethyl)-N-methyl acrylamide, N-1-methyl-2-methoxyethyl acrylamide, N-1-methoxymethylpropyl acrylamide, N-(1,3-dioxolan-2-ylmethyl)-N-methyl acrylamide, N-8-acryloyl-1,4-dioxa-8-azaspiro-[4,5]decane, N,N-di(2-methoxyethyl) acrylamide, N-2-methoxyethyl-N-n-propyl acrylamide, N-2-methoxyethyl-N-n-ethyl acrylamide, and N-methoxyethoxypropyl acrylamide.

Among the acrylamide type vinyl compounds mentioned above, N-n-propyl acrylamide, and N-isopropyl acrylamide are particularly desirable.

The acrylamide type vinyl compound is used in the form of an aqueous solution. The water used for the aqueous solution may be deionized water or distilled water.

Then, to this aqueous solution, a cationic surfactant or an anionic surfactant is added in a ratio equaling or exceeding the micelle concentration. Concrete examples of the cationic surfactant are those having hydrophobic groups of long chains of at least 12 carbon groups such as trimethylstearyl ammonium chloride $[C_{18}H_{37}N(CH_3)_3]Cl$, trimethylcetyl ammonium chloride $[C_{16}H_{33}N(CH_3)_3]Cl$, trimethylcetyl ammonium bromide $[C_{16}H_{33}N(CH_3)_3]Br$, and trimethyl-n-tetradecyl ammonium chloride $[C_{14}H_{29}N(CH_3)_3]Cl$. Long-chain cationic surfactants of other kinds than those cited above may be used instead. Specific examples of the anionic surfactant are those having hydrophobic groups of long chains of at least 12 carbon atoms such as alkylbenzene sulfonates, typically hard sodium dodecylbenzene sulfonate, soft sodium dodecylbenzene sulfonate, and sodium 4-n-octylbenzene sulfonate: sulfonic esters such as sodium dodecyldiphenyl ether disulfonate and sodium nonylphenol sulfuric ester; and sodium dioctylsulfosuccinate and sodium dodecylsulfate. Long-chain anionic surfactants of other kinds than those mentioned above may also be used. One member or a combination of two or more members selected from the group of cationic surfactants cited above or one member or a combination of two or more members selected from the group of anionic surfactants cited above may be used. Among the ionic surfactants enumerated above, trimethylstearyl ammonium chloride and sodium dodecylbenzene sulfonate are particularly desirable. In the solution having such a surfactant added to the aqueous solution of thermosensitive macromolecular compound, the aqueous solution of the thermosensitive macromolecular compound undergoes phase transition on heating. In this case, part of the macromolecular compound undergoes phase transition within the micelles of the surfactant and is consequently precipitated in the form of minute particles.

This phenomenon in the aqueous solution is observable as a change in transparency. In this case, since the change in transparency occurs slowly, the phenomenon of phase transition due to the elevation of temperature is thought to proceed slowly in appearance due to the formation of minute particles. This phenomenon does not occur in a solution having a short-chain ionic surfactant or a nonionic surfactant added to the aqueous solution of thermosensitive macromolecular compound. The surfactant usable in this invention should avoid addition of a substance capable of conspicuously altering the clouding point of the aqueous solution of the thermosensitive macromolecular compound and allows addition of a substance incapable of conspicuously altering the clouding point.

After the addition of the surfactant described above, the aqueous solution now containing the surfactant is homogenized.

The method to be employed for converting the aqueous solution into a polymer emulsion will now be described.

The acrylamide type vinyl compound in the aqueous solution is polymerized.

The polymerization can be initiated by any of the well-known methods such as those using exposure to radiation or an electron beam, application of heat in the presence of a radical polymerization initiator, and exposure to light in the presence of a photosensitizer. The polymerization initiator may be any of various water-soluble radical initiators. The water-soluble radical polymerization initiators which are effectively usable herein include redox type initiators such as ammonium persulfate, potassium persulfate, and other similar persulfates, hydrogen peroxide, tert-butyl peroxide, and other similar peroxides, sulfites, hydrogen sulfites, and ceric ammonium nitrate and azo compounds such as 2,2'-azobis-2-amidionopropane hydrochloride, 2,2'-azobis-2,4-dimethyl valeronitrile, 4,4'-azobis-4-cyanovaleic acid and salts thereof, for example. It is permissible to use a combination of two or more of the initiators mentioned above. The amount of the radical polymerization initiator to be used herein is generally in the range of 0.01 to 5% by weight, preferably 0.05 to 1% by weight, based on the amount of the monomer. Though the polymerization temperature is variable with the kind of the polymerization initiator and the kind of the vinyl compound to be used, it is generally in the range of 0° C. to 100° C. and to be not lower than the clouding point of the aqueous macromolecular compound dispersion to be formed.

The polymer emulsion is obtained in consequence of the treatments described above. The polymer emulsion thus obtained is exposed to an ionizing radiation at a temperature exceeding the clouding point thereof to cross-link the polymer. The micelles in the resultant solution are disintegrated by addition of methanol or ethanol. The resultant dispersion is passed through an ultrafilter membrane to remove the surfactant. As a result, there is obtained a dispersion containing minute polymer beads possessing a thermosensitive characteristic.

The cross-linking treatment mentioned above is carried out by exposing the polymer emulsion to an ionizing radiation. The ionizing radiation thus used may be $\gamma$ ray, X ray, electron beam, $\alpha$ ray, or $\beta$ ray. The intensity of this radiation is desired to be in the range of $10^2$ to $10^{11}$ R/hr. The dosage is required to exceed $10^6$ R. The temperature at which this exposure to radiation is conducted is not lower than the clouding point of an aqueous solution of the polymer.

In consequence of the treatment just described, the aqueous dispersion containing polymer beads is obtained.

The hydrodynamic diameter, $D_M$, of the polymer beads in the aqueous dispersion was determined by the photon-correlated spectral method. Though variable with the preparative conditions, the hydrodynamic diameter of the polymer beads was found to be in the range of about 75 nm to 150 nm while the beads were in a swelled state and in the range of about 65 nm to 100 nm while they were in a a contracted state. The diameter distribution was close to that of the monodisperse system. These polymer beads are characterized by possessing a far smaller hydrodynamic diameter, $D_M$, than the beads produced by the method of reversed-phase suspension polymerization of the composition of solvent-surfactant-aqueous pregel solution [Yoshiharu Hirose, Takayuki Amiya, Yoshitsugu Hirokawa, and Toyoichi Tanaka, "Material for the First Polymer Gel Forum", 39 (1989)] (hydrodynamic diameter of about 800 nm in a swelled state and 200 to 300 nm in a contracted state). The mode of phase transition can be visually observed as a change in the transparency of the aqueous dispersion. The change in transparency in the aqueous dispersion containing polymer beads of diameters on the nanometer order is continuous. In sharp contrast thereto, this change is not continuous in bulk gels.

This invention concerns a method for the production of novel minute polymer beads possessing a thermosensitive characteristic (actually produced in the form of an aqueous dispersion containing such polymer beads). The minute polymer beads produced by this invention exhibit fully satisfactory performance in diagnostic microbeads, hydrogels for delivery of drugs, adsorbents for non-ionic surfactants, and cosmetics, and are expected to find extensive utility in numerous other applications.

This invention will now be described with reference to working examples. It should be noted, however, that this invention is not limited to these examples.

EXAMPLE 1

In an Erlenmeyer flask having an inner volume of 500 ml and provided with a dropping funnel and a gas inlet, 20.63 g of N-isopropyl acrylamide, 303 g of distilled water, and 1.14 g of trimethylstearyl ammonium chloride [cationic surfactant of general formula, $(CH_3(CH_2)_nN(CH_3)_3)Cl$ $(n=17)$] were placed and vigorously agitated by introducing nitrogen gas for one hour. The resultant mixture and 48.2 mg of ammonium persulfate added thereto were stirred as kept under a nitrogen atmosphere and heated at 60° C. for two hours to be polymerized. A polymer emulsion of a light blue color was formed as the polymerization proceeded. The polymer emulsion was heated to a temperature exceeding the clouding point, 31° C., of poly(N-isopropyl acrylamide), and exposed to a prescribed dosage of the γ ray from Co60 for a prescribed time. The conditions of the irradiation are shown in Table 1.

TABLE 1

| No. | Dose ratio (MR/hr) | Irradiation time (hr) | Dosage (MR) | Temperature (°C.) |
|---|---|---|---|---|
| α-1 | 0.145 | 20 | 3 | 60–45° C. |
| α-2 | 0.904 | 6 | 5.4 | 60–45° C. |

Thus, the polymer was synthesized in the emulsion. Since the polymer was within the micelles, these micelles were disintegrated by adding methanol piecemeal to the emulsion at a rate not so high as to induce precipitation of the polymer. Then, the polymer emulsion was repeatedly treated with an ultrafilter membrane to be deprived of the surfactant. The absence of the surfactant from the treated polymer emulsion was ascertained by determining the electroconductivity of the polymer emulsion.

The hydrodynamic radius, $R_M$, of the beads in the polymer emulsion obtained as described above was determined by the photon-correlated spectral method. The aqueous solution containing gel beads was diluted to two to five times the original volume. The diluted aqueous solution was passed through a 5-μm filter and transferred into a light-scattering cell measuring $1 \times 1 \times 5$ cm$^3$. The temperature of this cell was controlled in the range of 24° C. to 35° C. The time correlation constant function obtained by the digital correlator was established by the cumulants method. The hydrodynamic diameter, $D_M$, was found in accordance with the Einstein-Stokes formula using the average diffusion constant determined by the cumulants method. The results are shown in Table 2.

TABLE 2

| No. | $D_M$ (nm) 25 (°C.) | $D_M$ (nm) 30 (°C.) | $D_M$ (nm) 35 (°C.) |
|---|---|---|---|
| α-1 | 105 | 91 | 89 |
| α-2 | 110 | 85 | 73 |

EXAMPLE 2

In an Erlenmeyer flask having an inner volume of 500 ml and provided with a dropping funnel and a gas inlet, 20.13 g of N-isopropyl acrylamide, 302.5 g of distilled water, and 1.01 g of sodium dodecylbenzene sulfonate were placed and vigorously agitated by introducing nitrogen gas therethrough for one hour. The resultant mixture and 31.5 mg of ammonium persulfate added thereto were stirred as kept under a nitrogen atmosphere and heated for polymerization at 60° C. for two hours and 30 minutes. A polymer emulsion of a light blue color was formed as the polymerization proceeded. The polymer emulsion was heated to a temperature exceeding the clouding point of an aqueous solution of poly(N-isopropyl acrylamide) and exposed to the γ ray at a dose range of 0.904 MR/hr for 24 hours. The dosage was 22 MR. By faithfully following the procedure of Example 1, the polymer emulsion was deprived of the surfactant. By a determination performed in entirely the same manner as in Example 1, the relation between the hydrodynamic diameter $D_M$ and the temperature was found. The results are shown in Table 3.

TABLE 3

| No. | $D_M$ (nm) 25 (°C.) | $D_M$ (nm) 30 (°C.) | $D_M$ (nm) 35 (°C.) |
|---|---|---|---|
| β-1 | 143 | 120 | 99 |

What is claimed is:

1. A method for the production of a dispersion containing minute polymer beads possessing a thermosensitive characteristic and having a hydrodynamic diameter in the range of about 75 nm to 150 nm in a swelled state and in the range of about 65 nm to 100 nm in a contracted state, which comprises the steps of:

preparing an aqueous solution of an acrylamide type vinyl compound which is represented by the general formula:

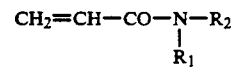

wherein $R_1$ and $R_2$ are selected from the group consisting of hydrogen atom, alkyl groups and alkoxyalkyl groups and whose homopolymer exhibits the characteristic of hydrophilicty-hydrophobicity thermoreversible solubility;

adding to said aqueous solution one surfactant selected from the group consisting of cationic surfactants and anionic surfactants and having a hydrophobic group containing at least 12 carbon atoms in the side chain thereof in a ratio equaling or exceeding the micelle concentration, thereby obtaining a homogeneous aqueous dispersion;

adjusting the resultant aqueous dispersion to a temperature exceeding the clouding point of said aqueous dispersion and, at the same time, polymerizing said acrylamide type vinyl compound in the aqueous solution, thereby producing a polymer emulsion;

adjusting said polymer emulsion to a temperature equaling or exceeding the clouding point thereof and, at the same time, exposing said polymer emulsion to an ionizing radiation, thereby cross-linking the polymer forming said emulsion; and removing said one surfactant from the resultant product.

2. A method according to claim 1, wherein said acrylamide type vinyl compound is one member selected from the group consisting of N-ethyl acrylamide, N-n-propyl acrylamide, N-isopropyl acrylamide, N-cyclopropyl acrylamide, N,N-diethyl acrylamide, N-methyl-N-ethyl acrylamide, N-methyl-N-n-propyl acrylamide, N-methyl-N-isopropyl acrylamide, N-acryloyl piperidine, N-acryloyl pyrrolidine, N-tetrahydrofurfuryl acrylamide, N-methoxypropyl acrylamide, N-ethoxypropyl acrylamide, N-isopropoxypropyl acrylamide, N-ethoxyethyl acrylamide, N-(2,2-dimethoxyethyl)-N-methyl acrylamide, N-1-methyl-2-methoxyethyl acrylamide, N-1-methoxymethylpropyl acrylamide, N-(1,3-dioxolan-2-ylmethyl)-N-methyl acrylamide, N-8-acryloyl-1,4-dioxa-8-azaspiro-[4,5]decane, N,N-di(2-methoxyethyl) acrylamide, N-2-methoxyethyl-N-n-propyl acrylamide, N-2-methoxyethyl-N-n-ethyl acrylamide, and N-methoxyethoxypropyl acrylamide.

3. A method according to claim 2, wherein said acrylamide type vinyl compound is one member selected from the group consisting of N-n-propyl acrylamide, and N-isopropyl acrylamide.

4. A method according to claim 1, wherein said cationic surfactant is trimethyl stearyl ammonium chloride.

5. A method according to claim 1, wherein said anionic surfactant is sodium dodecylbenzene sulfonate.

6. A method according to claim 1, wherein said ionizing radiation is one member selected from the group consisting of $\gamma$ ray, X ray, electron beam $\alpha$ ray, and $\beta$ ray.

7. A method according to claim 6, wherein the intensity of said radiation is in the range of $10^2$ to $10^{11}$ R/hr.

8. A method according to claim 7, wherein the dosage of said radiation is at least $10^6$ R.

* * * * *

UNITED STATES PATENT AND TRADEMARK OFFICE
CERTIFICATE OF CORRECTION

PATENT NO. : 5,093,030
DATED : March 3, 1992
INVENTOR(S) : Shoji Ito et al.

It is certified that error appears in the above-identified patent and that said Letters Patent is hereby corrected as shown below: On the title page: Items, [75] and [73]

The second inventor's name is spelled incorrectly, should be, -- Okihiko Hirasa--, and the assignee is incorrect, should be, -- Agency of Industrial Science & Technology, Ministry of International Trade & Industry, Tokyo, Japan--.

Signed and Sealed this

Twenty-ninth Day of June, 1993

Attest:

MICHAEL K. KIRK

Attesting Officer

Acting Commissioner of Patents and Trademarks